US012757989B2

(12) United States Patent
Lo

(10) Patent No.: US 12,757,989 B2
(45) Date of Patent: Oct. 13, 2026

(54) CONVERTIBLE SUITCASE STROLLER APPARATUS

(71) Applicant: TERNX HOLDINGS PTY LTD, Victoria (AU)

(72) Inventor: Hoe Ping Lo, Victoria (AU)

( * ) Notice: Subject to any disclaimer, the term of this patent is extended or adjusted under 35 U.S.C. 154(b) by 206 days.

(21) Appl. No.: 18/550,129

(22) PCT Filed: Mar. 4, 2022

(86) PCT No.: PCT/AU2022/050185
§ 371 (c)(1),
(2) Date: Sep. 11, 2023

(87) PCT Pub. No.: WO2022/187891
PCT Pub. Date: Sep. 15, 2022

(65) Prior Publication Data

US 2024/0298763 A1 Sep. 12, 2024

(30) Foreign Application Priority Data

Mar. 9, 2021 (AU) ................................ 2021900664

(51) Int. Cl.

| | |
|---|---|
| ***A45C 9/00*** | (2006.01) |
| ***A45C 5/14*** | (2006.01) |
| ***A45C 13/26*** | (2006.01) |
| ***B62B 7/06*** | (2006.01) |
| ***B62B 7/08*** | (2006.01) |

(52) U.S. Cl.
CPC .................. *A45C 9/00* (2013.01); *A45C 5/14* (2013.01); *A45C 13/262* (2013.01); *B62B 7/064* (2013.01); *B62B 7/08* (2013.01); *A45C 2009/002* (2013.01); *A45C 2009/005* (2013.01); *B62B 2206/006* (2013.01)

(58) Field of Classification Search
CPC ........... A45C 9/00; A45C 5/14; A45C 13/262; A45C 2009/002; A45C 2009/005; B62B 7/064; B62B 7/08; B62B 2206/006
USPC .............................................................. 190/1
See application file for complete search history.

(56) References Cited

U.S. PATENT DOCUMENTS 2,577,579 A * 12/1951 Hall .......................... B62B 9/26 280/643
6,746,079 B2 * 6/2004 Cabedo-Deslierres ...................... B62B 5/085 297/344.21
2011/0089670 A1 * 4/2011 Henry ....................... B62B 7/08 280/647

FOREIGN PATENT DOCUMENTS

| | | | | | |
|---|---|---|---|---|---|
| CN | 106235560 | A | * | 12/2016 | |
| CN | 207855239 | U | * | 9/2018 | |
| EP | 2133003 | A2 | * | 12/2009 | ........... A45C 13/385 |
| GB | 2519297 | A | * | 4/2015 | ............... A45C 5/14 |
| WO | WO-0215738 | A1 | * | 2/2002 | ........... A45C 13/385 |
| WO | WO-2016163198 | A1 | * | 10/2016 | ............... B62B 7/08 |

* cited by examiner

*Primary Examiner* — Nathan J Jenness
*Assistant Examiner* — Jessica Kavini Tamil
(74) *Attorney, Agent, or Firm* — Intellectual Strategies

(57) ABSTRACT

A convertible suitcase stroller apparatus comprising a suitcase portion, a stroller frame, and a seat, wherein the apparatus is configurable between a retracted suitcase configuration and a deployed stroller configuration for seating and transporting a child.

12 Claims, 11 Drawing Sheets

CONVERTIBLE SUITCASE STROLLER APPARATUS

FIELD OF THE INVENTION

The present invention relates to a convertible suitcase stroller apparatus that is convertible between a suitcase configuration and a stroller configuration.

BACKGROUND

Travelling with children can be physically and logistically demanding, particularly if the children are young and require being transported in a pram or stroller. In such circumstances, parents may be physically burdened not only by their luggage and their children's luggage, but also by the one or more strollers required to transport their children. This can be a cumbersome and expensive way to travel, especially by air since most airlines require large objects such as strollers to be checked in or stored in a bag.

There have been attempts to construct suitcases that double as a device for transporting children, however many do not comply with international stroller standards. In such convertible apparatuses, the child is typically seated directly on or adjacent an upper end of the suitcase, facing away from the direction of forward travel. This is shown in, for example, U.S. Pat. No. 10,238,195. In such an arrangement, both the weight of the suitcase (including the contents therein), along with the weight of the child, lean or are inclined in the same direction. As such, the framing or support structure of the stroller must be relatively strong to support forces and weight applied from a common direction; having stronger framing and support structures and the like tend to increase the weight of the suitcase, which makes it less practical for lightweight and convenient travel.

Additionally, with the child supported thereon, the stroller configuration can become relatively awkward, difficult and less stable to wheel and manoeuvre, not least because both the weight of the suitcase and the child lean and work against the direction of travel.

Existing convertible apparatuses generally only provide a relatively temporary solution for transporting children. Moreover, the child transportation configurations are quite makeshift and can thus be uncomfortable for the child over an extended period, and may not meet the various stringent safety requirements and codes applicable to regular strollers and thus may prevent their use in various public spaces. Additionally, existing convertible apparatuses can be relatively clunky and heavy and may not be accepted as carry-on items with many airlines.

There is a need to address the above, and/or at least provide a useful alternative.

SUMMARY

According to a first aspect of the present invention, there is provided a convertible suitcase stroller apparatus, comprising:

- a suitcase portion having a front region via which the suitcase may be opened, a rear, and a first set of wheels;
- a stroller frame comprising a pair of laterally opposed legs, a first end of each leg being movably associated with the suitcase portion, a second end of each leg being associated with a respective wheel of a second set of wheels; and

- a seat comprising a seat portion and a backrest configured to be stowed together and deployed from generally between the legs of the frame, wherein the convertible apparatus is movable between:

- a retracted suitcase configuration in which: the frame is generally adjacent the rear of the suitcase portion such that the second sets of wheels is generally adjacent the first set of wheels; and the seat is stowed between the legs of the frame and against the rear of the suitcase portion such that the backrest and the front region of the suitcase portion generally define, respectively, a back and front of the suitcase configuration; and
- a deployed stroller configuration for seating and transporting a child in which: the frame and seat are moved away from the rear of the suitcase portion such that the first set of wheels of the suitcase portion define rear wheels of the stroller configuration and the second set of wheels of the stroller frame are spaced from the first set of wheels to define front wheels of the stroller configuration; and the seat portion and backrest are deployed from the frame to define the seat of the stroller configuration.

In embodiments of the convertible apparatus, the first end of each leg of the frame is pivotably associated with the suitcase portion, the frame being pivotal between:

- the retracted suitcase configuration, in which the frame lines in a plane that is generally parallel to that of the rear of the suitcase portion; and
- the deployed stroller configuration, in which the frame is pivoted away from the rear of the suitcase portion.

In embodiments of the convertible apparatus, the frame is extendible and an upper end thereof is configured to define a handle for:

- transporting the convertible apparatus when in the retracted suitcase configuration; and
- wheeling the stroller when the convertible apparatus is in the deployed stroller configuration.

In embodiments of the convertible apparatus, the legs of the frame are pivotal about an upper end of the suitcase portion, the legs being telescopically extendible to effect height adjustment of the handle.

In embodiments of the convertible apparatus, in the retracted suitcase configuration, the backrest and seat portion are folded together so as to lie on respective planes that are generally parallel to and/or the same as that of the frame, and in the deployed stroller configuration, the backrest and seat portion are unfolded from one another so as to define the seat.

In embodiments of the convertible apparatus:

- in the retracted suitcase configuration, the second set of wheels assumes a stowed configuration; and
- in the deployed stroller configuration, the second set of wheels are deployed to engage the ground.

In embodiments of the convertible apparatus, in the retracted suitcase configuration, the second set of wheels is stowed at least partially beneath the suitcase portion.

Embodiments of the convertible apparatus further comprise a locking mechanism for selectively locking the frame adjacent to and away from the rear of the suitcase portion in the retracted and deployed configurations respectively.

In embodiments of the convertible apparatus, in the deployed stroller configuration:

- the suitcase portion is disposed toward a rear of the stroller and is angled forwardly in the direction of forward travel of the stroller configuration; and the backrest of the deployed seat is angled rearwardly such that a child seated thereon leans back and in the direction of rearward travel of the stroller.

According to a second aspect of the present invention, there is provided a method of converting a convertible suitcase stroller apparatus according to a first aspect of the invention from the suitcase configuration to the stroller configuration, comprising:

moving the frame and seat away from the rear of the suitcase portion such that the second set of wheels is spaced apart from the first set of wheels in the direction of travel of the stroller;

deploying the seat portion and backrest from between the frame so as to define the seat of the stroller.

In embodiments of the method, moving the frame comprises first releasing a locking mechanism to enable pivoting of the frame forward from the rear of the suitcase portion.

Embodiments of the method further comprise extending the frame upwardly such that an upper end of the frame defines a handle via which the stroller can be wheeled.

While the subject matter of the present specification is primarily referred to as a convertible suitcase stroller apparatus, or, for brevity, convertible apparatus, it will be appreciated that the scope of the present patent specification applies to a stroller that is convertible into a suitcase, and/or a suitcase that is convertible into a stroller.

BRIEF DESCRIPTION OF THE DRAWINGS

In order that the invention may be more easily understood, an embodiment will now be described, by way of example only, with reference to the accompanying drawings in which.

DETAILED DESCRIPTION

Figure 1:
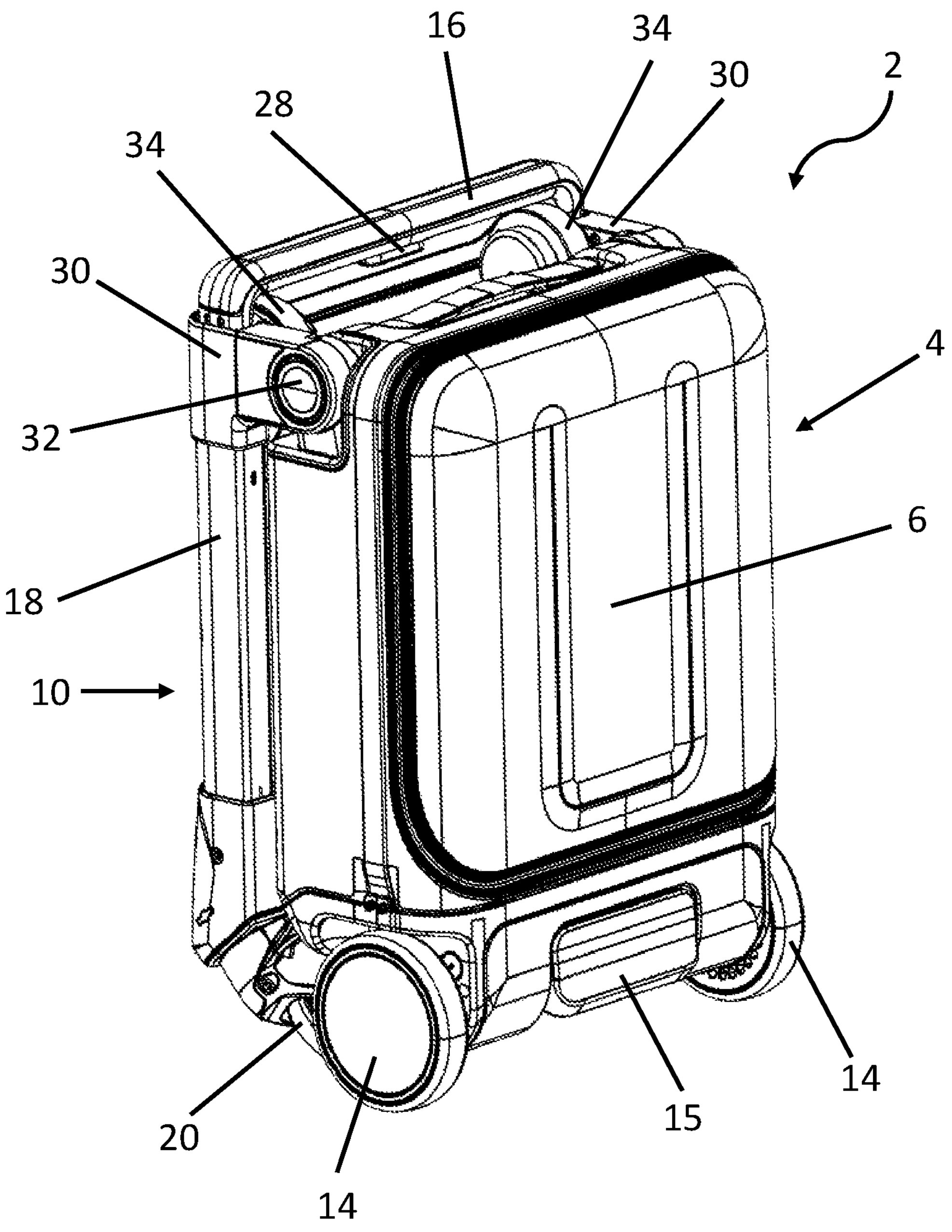
FIG. 1 is a front perspective view of an embodiment of a convertible suitcase stroller apparatus in a retracted suitcase configuration.

The present patent specification discloses a suitcase stroller apparatus that is convertible between a suitcase configuration (e.g., FIG. 1) and a stroller configuration (e.g., FIG. 9) and will be referred to as a convertible apparatus or travel apparatus 2.

The convertible apparatus 2 enables a user to carry personal belongings in a suitcase portion 4 thereof, and to seat and transport their child by converting the travel apparatus 2 into a stroller. It is envisaged the stroller may carry a child weighing up to about 22 kilograms.

When in the suitcase configuration, the convertible apparatus 2 may be sufficiently small and lightweight enough to bring on commercial aeroplanes as carry-on luggage, thereby reducing the time and costs associated with checking in luggage. For example, the suitcase portion 4 may have a storage capacity of approximately 20 litres, and the convertible apparatus 2 may weight approximately seven kilograms and be formed from materials such as polycarbonate, aluminium, and plastic. Preferably, the convertible apparatus 2 meets IATA (International Air Transport Association) and TSA (Transportation Security Administration) carry on standards. The convertible apparatus 2 may allow parents to reduce the number of strollers and/or suitcases they need to lug around and/or check in when travelling.

Embodiments of the present convertible apparatus 2 will now be described with reference to the Figures.

FIGS. 1 to 5 show embodiments of the convertible apparatus 2 in a generally retracted suitcase configuration. In this configuration, the convertible apparatus 2 is configured to generally look and function like a regular suitcase. It has a main suitcase portion 4 in which personal belongings may be stored. An exterior of the suitcase portion 4 may be formed from a generally hard and protective shell. In the depicted embodiment, the suitcase portion 4 has a generally rectangular cross-section, and comprises a front region or front region 6 which is exposed to the user via which the suitcase portion 4 can be opened to access an interior thereof.

Referring to FIGS. 2 and 6 to 10, the suitcase portion 4 also has an opposite rear face or side 8 which, in the suitcase configuration, may be substantially obscured or covered by a stroller frame 10 and/or seat 12 of the convertible apparatus 2, which components will be discussed later. The rear 8 of the suitcase portion 4 may also be formed from a generally hard material and serve as a protective backing for personal belongings stored in the suitcase portion 4.

A lower end or base of the suitcase portion 4 is provided with a pair of laterally spaced apart wheels 14 which allow the convertible apparatus 2, in its retracted suitcase configuration, to be wheeled around like a regular suitcase. The wheels 14 may be larger than common suitcase wheels since these wheels 14 are adapted to function as the rear wheels of the stroller into which the convertible apparatus 2 can convert. It is envisaged that the present convertible apparatus 2 is aesthetically relatively inconspicuous in that in the retracted suitcase configuration, it may not be immediately apparent to the untrained eye that the convertible apparatus 2 is anything other than an ordinary suitcase.

Referring to FIG. 1, a lower rear end of a front 6 of the suitcase portion 4 is provided with a foot-operable brake 15 configured to lock the wheels 14 of the suitcase portion 4. This braking functionality is important for the safe operation of the convertible apparatus 2 when it is configured as a stroller, however the braking function may advantageously be utilised when the convertible apparatus 2 is configured as a suitcase.

Figure 2:
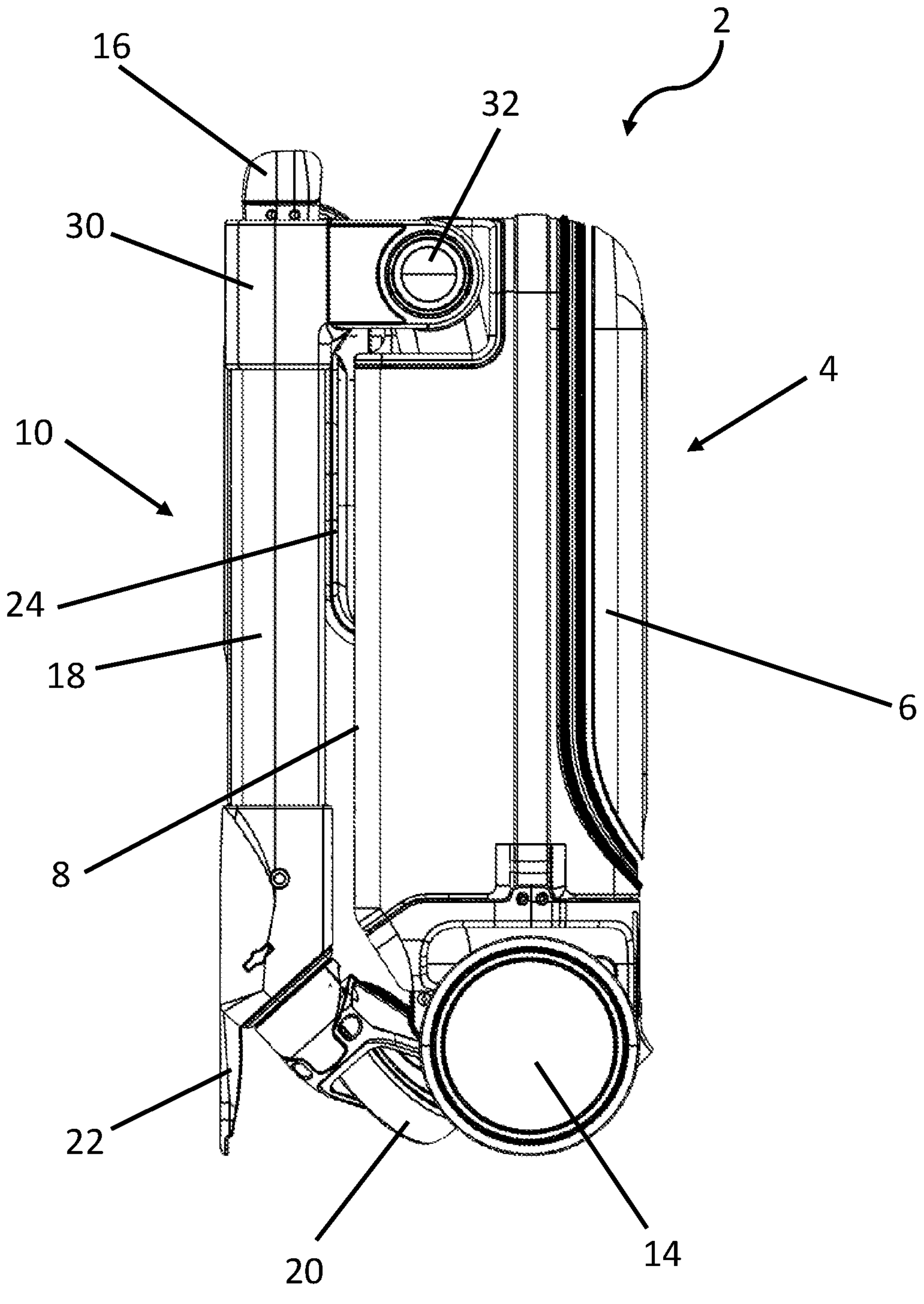
FIG. 2 is a side view of the convertible apparatus of FIG. 1.
Figure 6:
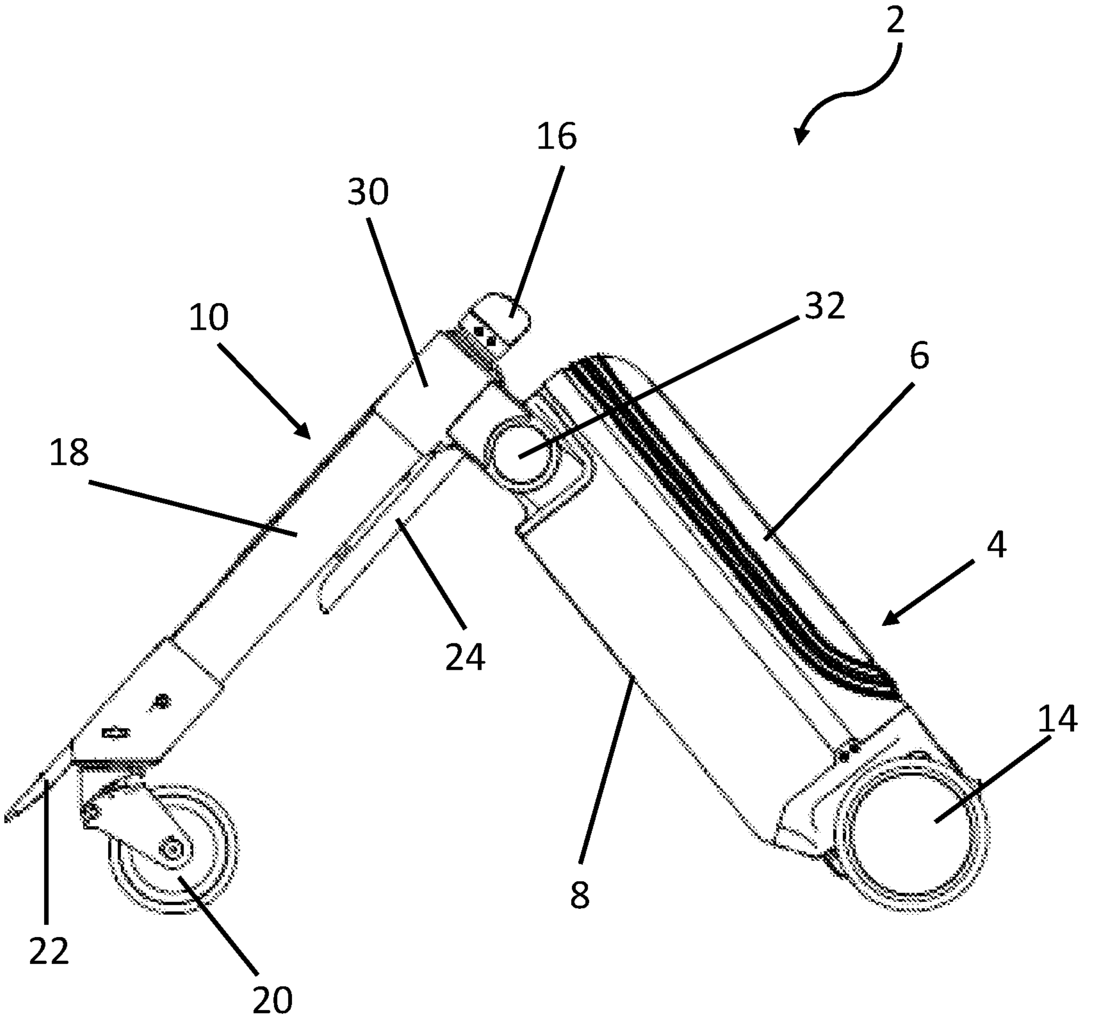
FIGS. 6, 7, and 8 are a sequence of side views showing the convertible apparatus of FIG. 1 being converted to assume a deployed stroller configuration.

As can be seen by comparing FIGS. 2 and 6, the convertible travel apparatus 2 comprises a stroller frame 10 that is movably associated with the suitcase portion 4 of the convertible apparatus 2. In the depicted embodiment, the frame 10 comprises a pair of laterally opposed legs 18 pivotally associated with an upper end of the suitcase portion 4, the legs 18 being adjustable to define a height-adjustable frame 10 of the stroller, as will be described.

Figure 5:
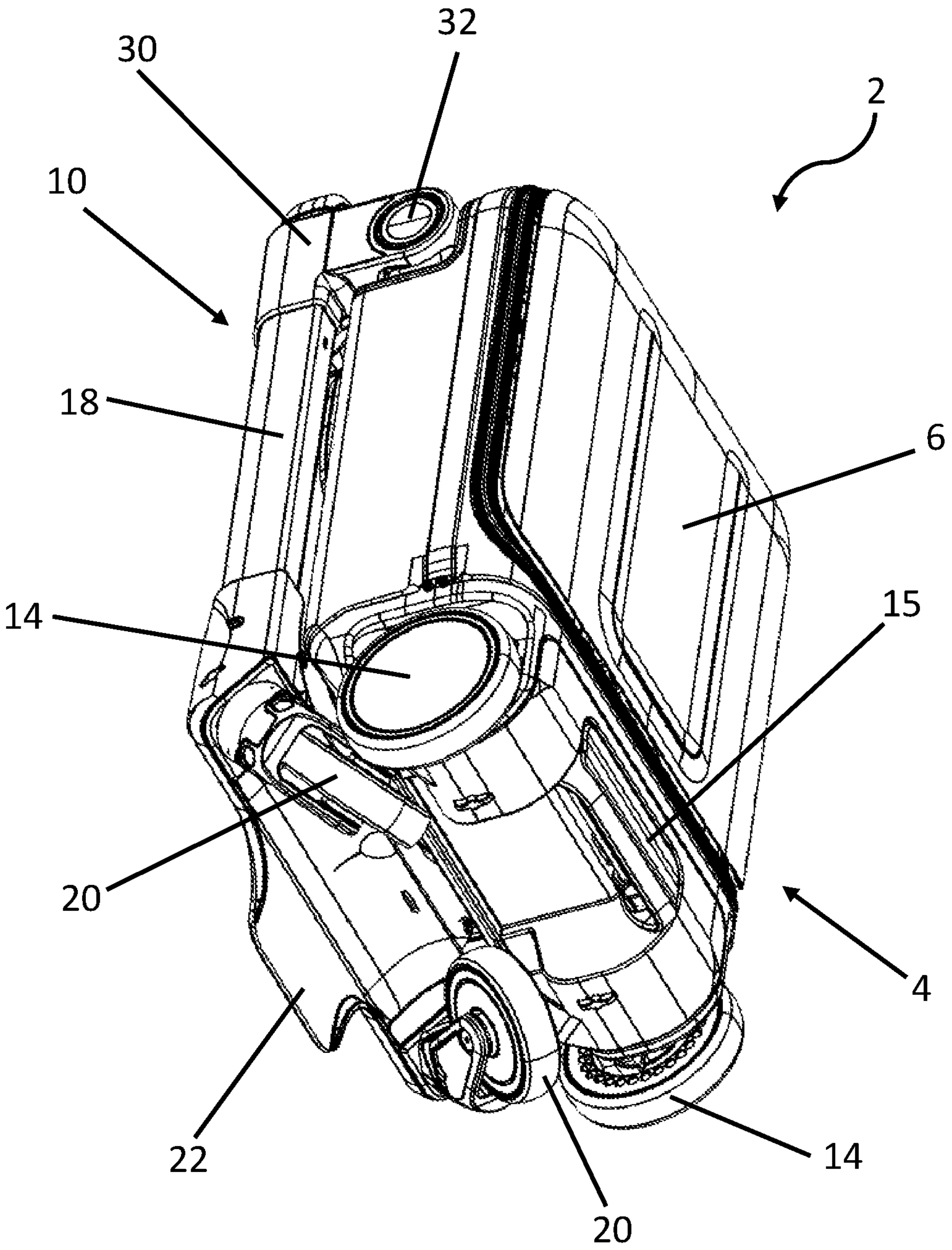
FIG. 5 is a bottom perspective view of the convertible apparatus of FIG. 1.

Referring to FIGS. 1 and 5, when the convertible apparatus 2 is in the retracted suitcase configuration, the frame 10 is generally adjacent the rear face 8 of the suitcase portion 4. The frame 10 is substantially rectangular and defined by the pair of laterally opposed legs 18 and an upper end that defines a handle 16 of the convertible apparatus 2. In the retracted suitcase configuration, the frame 10 lies in a plane that is generally parallel to that of the rear 8 of the suitcase portion 4.

When in the retracted suitcase configuration, the seat 12, which comprises a seat portion 24 and a backrest 26 (see FIG. 9) is configured to be stowed generally between the opposed legs 18 of the frame 10. This can be seen in FIG. 3, wherein the backrest 26 of the seat 24 is shown generally nested between the legs 18 of the frame 10. To the untrained eye, the backrest 26 may simply appear to be one side or face of the suitcase portion 4, opposite the front region 6.

A lower end of the frame 10 is provided with a pair of laterally disposed wheels 20. In the suitcase configuration, these wheels 20 may be at least partially, if not substantially, stowed beneath the suitcase portion 4 such that they do not engage the ground or roll thereon; this stowed configuration can be seen particularly with reference to FIGS. 2, 4 and 5.

Each wheel 20 of the frame 10 is configured to swivel about an axis that is angled relative to respective legs 18 of the frame 10. As such, the wheels 20 can be swivelled so as to be angled away from respective legs 18 of the frame 10 and nested such that a circular face of each wheel at least partially faces toward or is adjacent a base of the suitcase portion 4. It is envisaged that the wheels 20 may be releasably stowed via magnetic engagement means. It is also envisaged that when the wheels 20 are stowed, they do not contact the ground. Of course, in alternative embodiments, the wheels 20 may still contact the ground in the stowed configuration.

Figure 3:
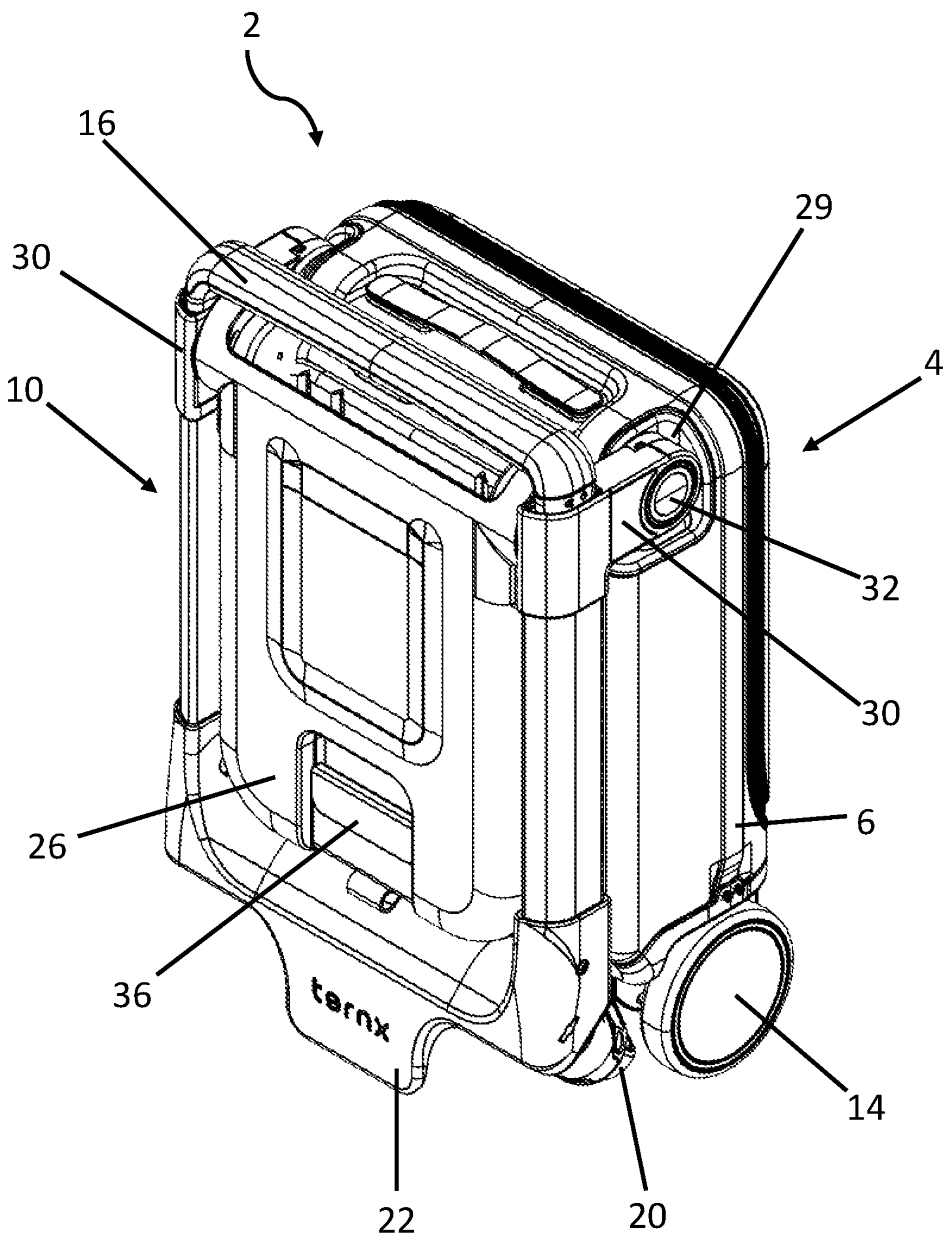
FIG. 3 is a rear perspective view of the convertible apparatus of FIG. 1.
Figure 4:
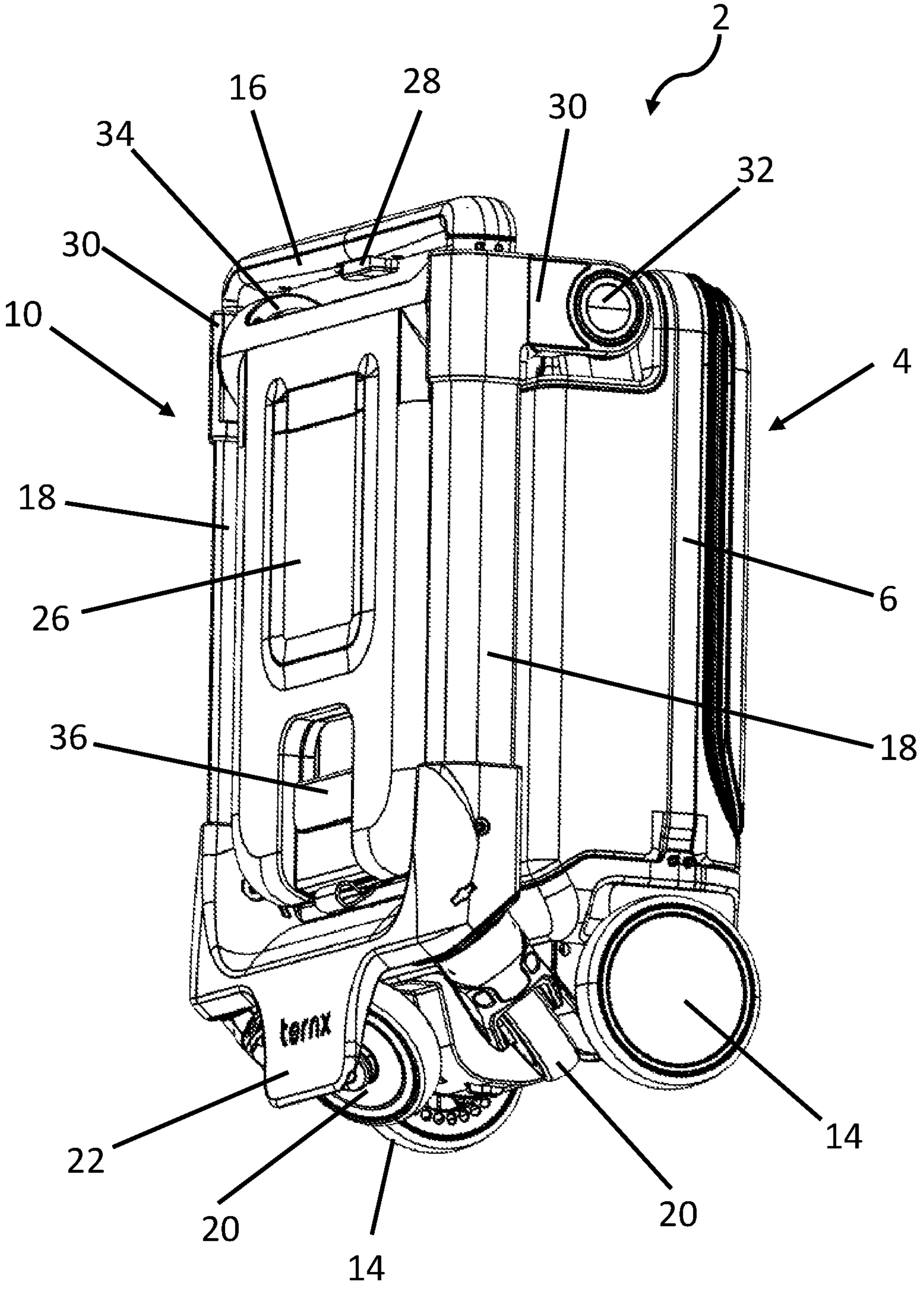
FIG. 4 is a side perspective view of the convertible apparatus of FIG. 1.

Referring to FIGS. 2 and 3, a lowermost portion of the stowed frame 10 comprises a ground-engaging support 22 which helps to support the suitcase portion 4 upright when the convertible apparatus 2 is in the suitcase configuration. With reference to FIG. 2, it is the front support 22 and the rear set of wheels 14 that engage the ground and support the suitcase portion 4 in an upright position, whereas the stowed away front wheels 20 are tucked beneath the suitcase portion 4 and do not engage the ground.

An upper end of the frame 10 comprises a handle 16 of the convertible apparatus 2. To this end, the legs 18 of the frame 10 may be extendable to enable height adjustment of the handle 16. For example, and with reference to FIG. 9, each leg 18 may comprise two or more telescopically arranged sections 18*a*, 18*b*, 18*c* which enable a telescopic extension and retraction of the legs 18 to effect height adjustment of the handle 16.

When the convertible apparatus 2 is generally in the retracted suitcase configuration, the legs 18 may be extended to raise the handle 16 to a desired height. In this way, the handle 16 can also be grasped by the user to wheel the convertible apparatus 2 around when it is in the suitcase configuration. The handle 16 may have a button or other operable means 28 which can be manually actuated to enable extension and retraction of the telescopic legs 18 via pulling and pushing of the handle 16. The handle 16 may also function as the handle 16 of the stroller, as will be described.

The conversion of the convertible apparatus 2 from its retracted suitcase configuration to the deployed stroller configuration will now be described.

FIGS. 1 to 5 show the convertible apparatus 2 in a retracted suitcase configuration or state. The extendable legs 18 of the frame 10 are retracted such that the handle 16 of the frame 10 is in a lowered position. The wheels 20 of the frame 10 are stowed and tucked beneath a base of the suitcase portion 4. In this retracted configuration, the convertible apparatus 2 is configured for storage during travel, such as in an overhead compartment of a plane, in the trunk of a car etc.

To convert the convertible apparatus 2 into a stroller, the frame 10 is first moved into an extended position relative to the suitcase portion 4, as shown in FIG. 6. In the depicted embodiment, the frame 10 is pivotably associated with the suitcase portion 4 such that a lower end of the frame 10 can be moved away from the suitcase portion 4. In particular, an upper end of the retracted legs 18 of the frame 10 may be interconnected to respective and recessed shoulders 29 (see FIG. 3) of the suitcase portion 4 via a pair of pivotal brackets 30. In this way, the pivotal brackets 30 enable the frame 10 to pivot between a retracted state or configuration in which the frame 10 lies in a plane that is generally parallel with the suitcase portion 4 and/or rear 8 thereof (FIG. 2), and an extended state in which it is generally angled and extends away from the suitcase portion 4 (FIG. 6).

The convertible apparatus 2 may comprise locking means for selectively locking the frame 10 in the retracted and/or extended states. For example, in the depicted embodiments, each pivoting bracket 30 may comprise a manually operable locking mechanism, such as a depressible button 32, for selectively locking the position or configuration of the frame 10. For example, by actuating both buttons 32, the frame 10 can be unlocked from the retracted suitcase configuration and pivoted outwardly to the extended configuration. Upon reaching the extended configuration, it is envisaged that the locking mechanism 32 can automatically engage or lock, thereby locking the frame 10 in the extended configuration ready for the convertible apparatus 2 to continue being converted to the stroller configuration.

As a safety precaution, it is envisaged that both buttons 32 need to be pressed, either at the same time, or consecutively (i.e., one button 32 within one second after the other) before the locking mechanism releases the frame 10 for repositioning. Similarly, the locking mechanism may be released to unlock the frame 10 from the deployed stroller configuration. When the frame 10 is repositioned back to the retracted configuration, it is envisaged that the locking mechanism will automatically engage to lock the frame 10 in the retracted configuration.

Figure 8:
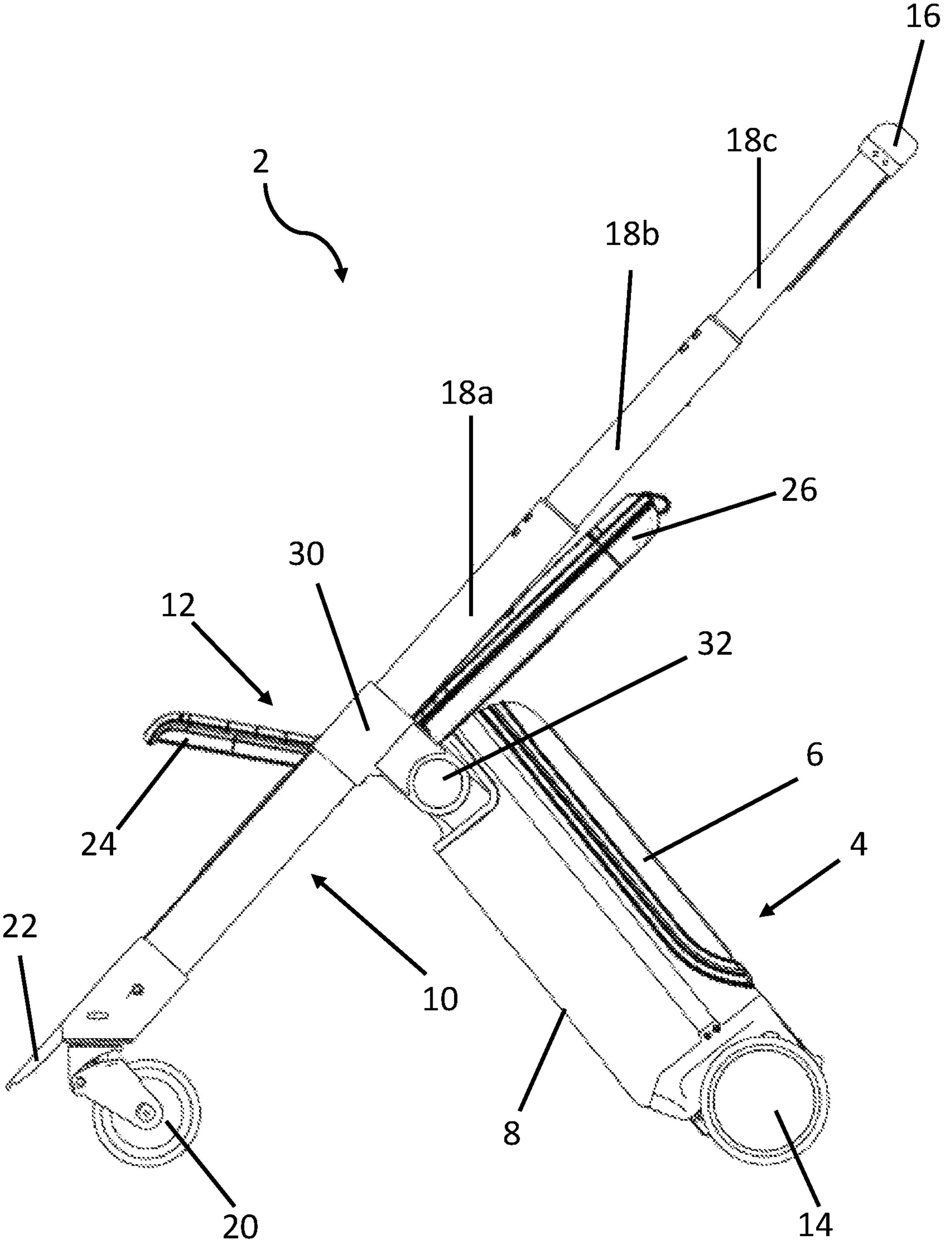

Referring to FIG. 8, in converting to the stroller configuration, the lateral wheels 20 of the frame 10 are released from their tucked away position and brought forward, along with a lower end of each leg 18 of the frame 10, to define the front wheels 20 of the stroller. The suitcase portion 4 is angled forward such that it leans in the direction of forward travel of the stroller. The wheels 14 of the suitcase portion 4 thus define the rear wheels 6 of the stroller configuration. In this arrangement, the axis about which the front wheels 20 can swivel is generally vertical (i.e., perpendicular to the ground), thereby allowing the stroller to be easier to physically manoeuvre.

Figure 7:
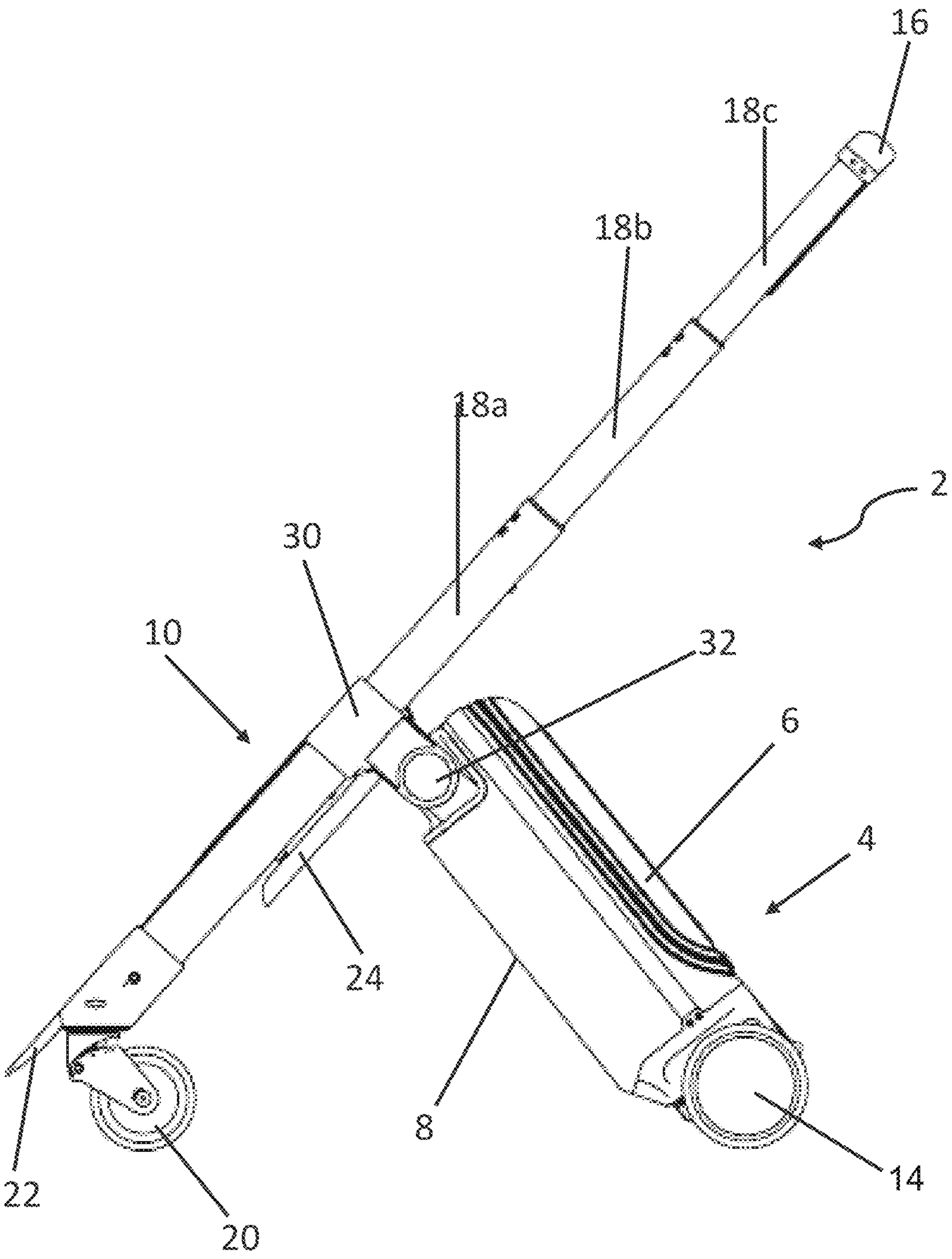

Progressing from FIG. 6 to FIG. 7, the handle 16 can then be lifted to extend the telescopic legs 18 of the frame 10. The handle 16 can thus function as the handle 16 of the stroller. It is envisaged that the extension of the telescopic legs 18 can be locked at various heights so that the height of the handle 16 can be adjusted per the user's requirements.

Progressing from FIG. 7 to FIG. 8, the seat 12 can be moved from its stowed configuration to the deployed configuration in which it is ready to receive and carry a child. In particular, the lower seat portion 24, which is partially visible in FIGS. 2, 6 and 7, may be pivoted upwardly so as to be configured for receiving the buttocks of the child. The backrest 26, which, when stowed, sits primarily between the legs 18 of the frame 10, may be pivoted upwardly and in the rearward direction of travel to define the backrest 26 of the seat 24. It is envisaged that the backrest 26 may be adjustable through one or more angular positions to suit the child. It is also envisaged that the backrest 26 may be height-adjustable to suit children of varying heights.

Figure 9:
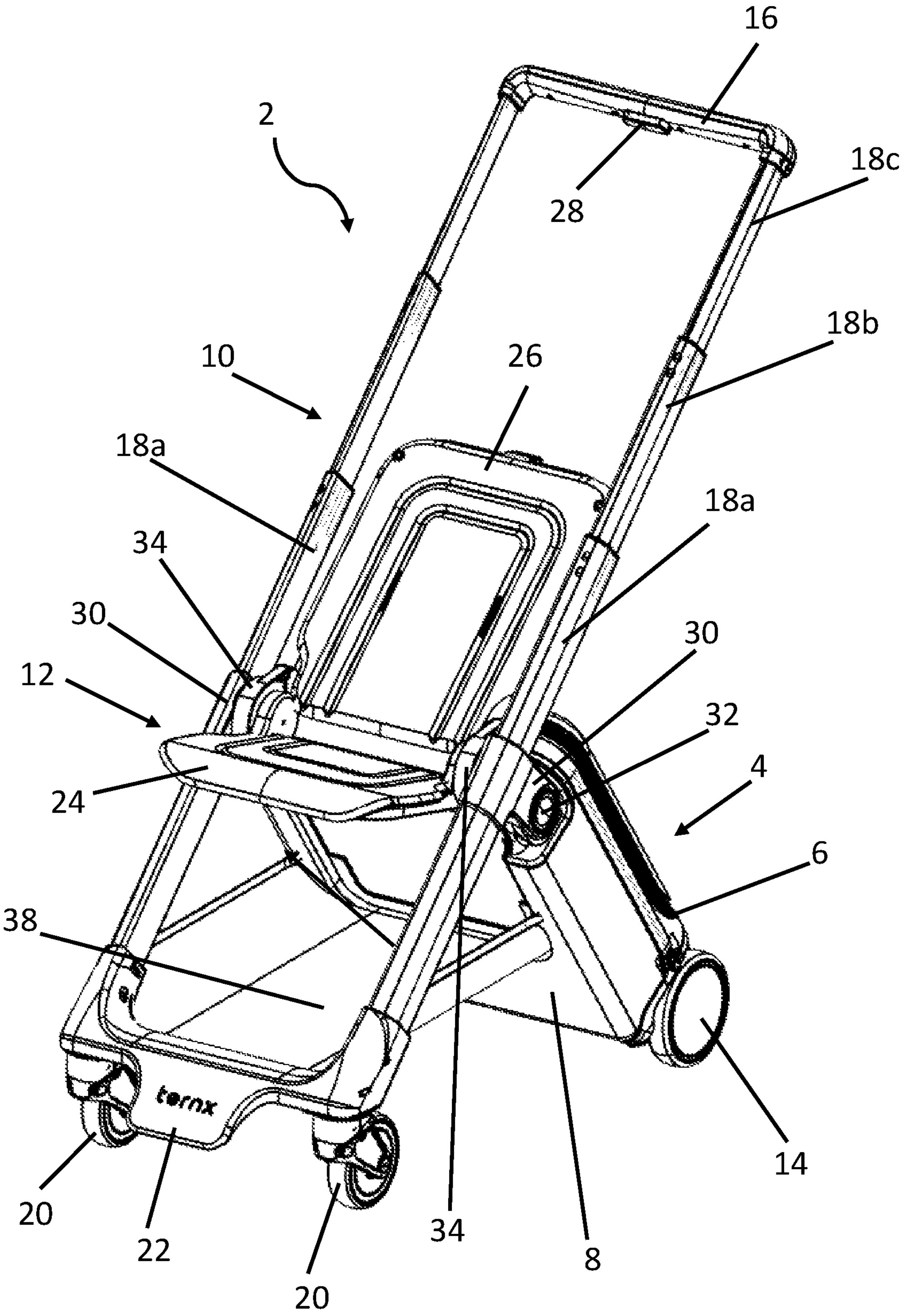
FIG. 9 is a front perspective view of another embodiment of a convertible suitcase stroller apparatus in a deployed stroller configuration.
Figure 10:
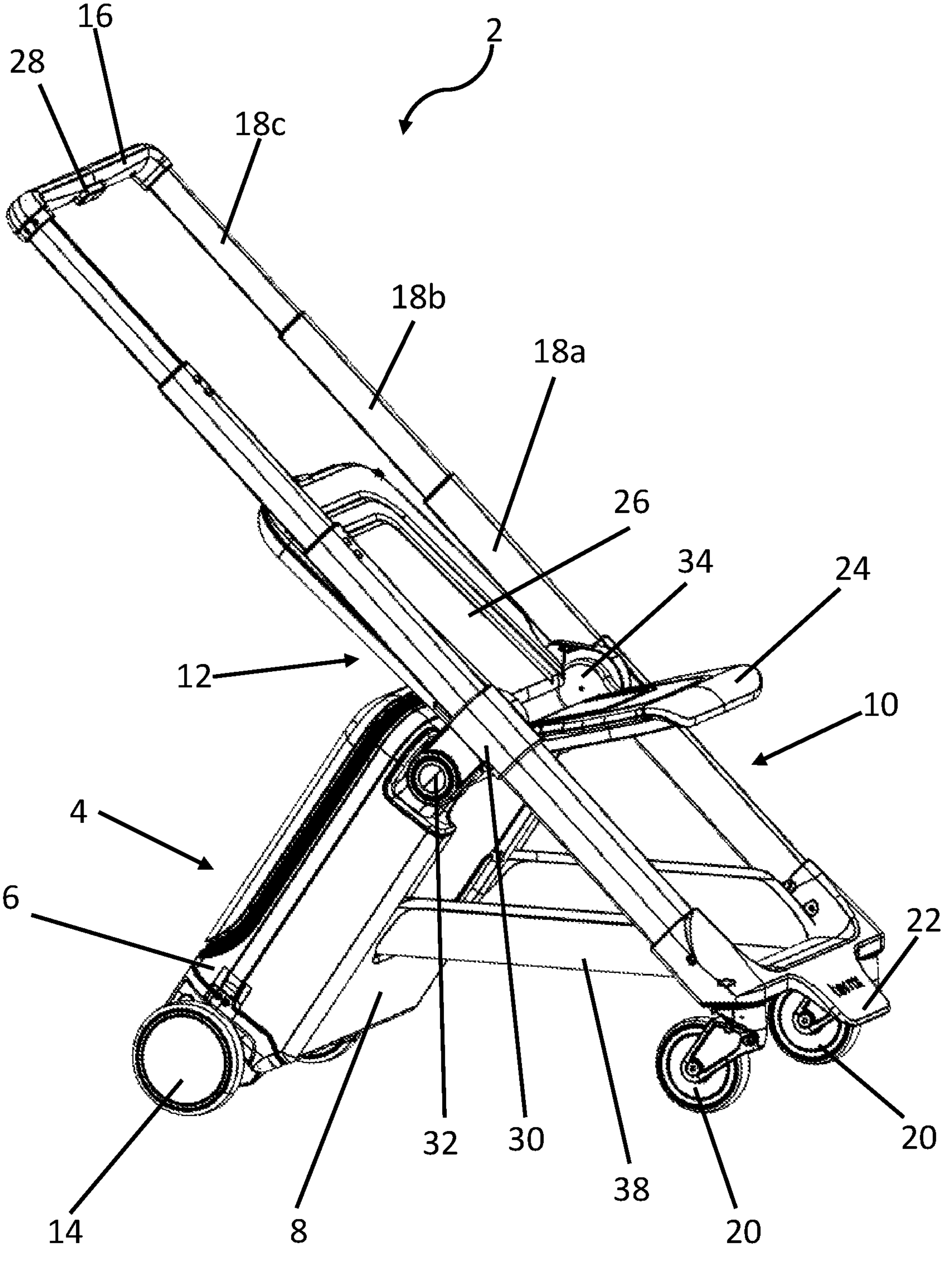
FIG. 10 is a side perspective view of the convertible apparatus of FIG. 9.

FIGS. 9 and 10 show the seat portion 24 and the backrest 26 are pivotally associated with one another, and the frame 10, via a pair of laterally disposed pivotal mounts 34. The mounts 34 may be pivotally associated with the brackets 30 and/or the legs 18 of the frame 10. The pivotal mounts 34 enable the seat portion 24 and backrest 26 to pivot and thus fold toward and away from one another and permit the seat portion 24 and backrest 26 to pivot between the stowed and deployed configurations relative to the legs 18 of the frame 10 between which the seat 12 is generally nested.

In a preferred embodiment, it is envisaged that the pivot mounts 34 are operably associated with the respective brackets 30 to prevent unsafe conversion of the convertible apparatus 2. For example, it is envisaged that when the convertible apparatus 2 is in the stroller configuration, it is not possible to move the legs 18 of the frame 10 back to the retracted suitcase configuration unless the seat 12 has already been stowed. For example, the pivotal mounts 34 may be configured to prevent release of the locking mechanism 32 of the frame 10 unless the seat 12 is first folded away. In this way, a user is prevented from inadvertently collapsing or folding the frame 10 toward the suitcase portion 4 while the child is still buckled in and seated on the seat 12. Of course, other means of ensuring that the frame 10 cannot be retracted toward the suitcase portion 4 unless the seat 12 is first stowed away are within the scope of the present specification.

Figure 11:
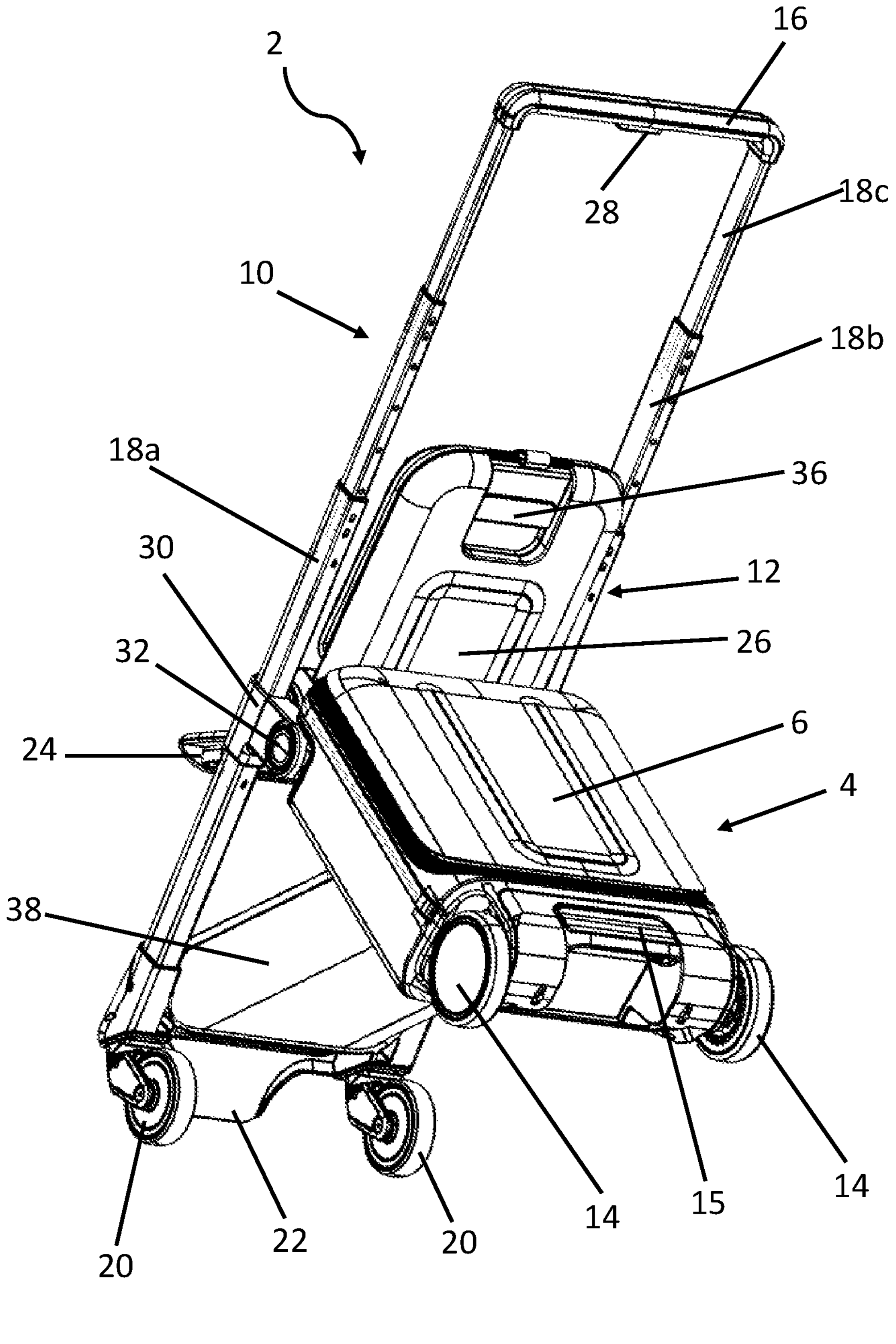
FIG. 11 is a rear perspective view of the convertible apparatus of FIG. 9.

Referring to FIGS. 3 and 11, the backrest 26 of the seat 12 comprises a leverable handle 36 via which the backrest 26 can be unfolded and adjusted. For example, when the convertible apparatus 2 is in the stroller configuration, it is envisaged that the backrest 26 and/or seat portion 24 of the seat 12 are selectively locked in position via a seat locking means. The handle 36 can then be manually actuated to release locking of the seat 12 and thus permit repositioning of the backrest 26 and/or folding up of the seat portion 24 and backrest 26.

Referring to FIG. 9, in use, the weight and loading of the suitcase portion 4 leans away from the user and in the direction of forward travel of the stroller. When a child is secured to the stroller, the child faces forward in the direction of travel and away from the user and can lean back against the backrest 26 such that loading from the child acts rearwardly toward the user and in the rearward direction of travel. By having the weight of the suitcase portion 4 and the child act at least partially in opposed directions, the present stroller configuration achieves a relatively centred or balanced centre of gravity, which allows the stroller to be easier to handle and manoeuvre.

Many modifications of the above embodiments will be apparent to those skilled in the art without departing from the scope of the present invention.

For example, the seat 24 may be configured with any number of known mechanisms for securing the seated child, such as a five-point harness.

It will be noted that the embodiment shown in FIGS. 9 to 11 includes a collapsible tray-like mesh 38 configured to extend between the back 8 of the suitcase portion 4 and a lower end of the frame 10, which mesh 38 functions as easy-access storage for personal belongings.

Although the Figures show a frame 10 that is pivotably associated with the suitcase portion 4, the convertible apparatus 2 can be converted to a stroller via other mechanisms such as a scissors mechanism. In another example, the frame could comprise a pair of legs received within respective recesses formed in respective sides of the suitcase portion, which legs may swing or extend out to define a frame of the stroller.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A convertible suitcase stroller apparatus, comprising:
- a suitcase portion having a front region via which the suitcase may be opened, a rear, and a first set of wheels;
- a stroller frame comprising a pair of laterally opposed legs, a first end of each leg being movably associated with the suitcase portion, a second end of each leg being associated with a respective wheel of a second set of wheels; and
- a seat comprising a seat portion and a backrest configured to be stowed together and deployed from generally between the legs of the stroller frame, wherein the backrest pivots and rotates relative to the laterally opposed legs,
- a pivot, located at a top of the suitcase portion, where the stroller frame pivots and rotates relative to the suitcase portion;

wherein the apparatus is movable between:
- a retracted suitcase configuration in which: the stroller frame is generally adjacent the rear of the suitcase portion such that the second set of wheels is generally adjacent the first set of wheels; and the seat is stowed between the legs of the stroller frame and against the rear of the suitcase portion such that the backrest and the front region of the suitcase portion generally define, respectively, a back and front of the suitcase configuration; and
- a deployed stroller configuration for seating and transporting a child in which: the stroller frame and seat are moved away from the rear of the suitcase portion such that the first set of wheels of the suitcase portion define rear wheels of the stroller configuration and the second set of wheels of the stroller frame are spaced from the first set of wheels to define front wheels of the stroller configuration; and the seat portion and backrest are deployed from the stroller frame to define the seat of the stroller configuration, and wherein the suitcase is rotated to a position nonorthogonal to the ground when in the deployed stroller configuration.

2. The convertible apparatus of claim 1, wherein the first end of each leg of the stroller frame is pivotably associated with the suitcase portion, the stroller frame being pivotal between:

the retracted suitcase configuration, in which the stroller frame lies in a plane that is generally parallel to that of the rear of the suitcase portion; and the deployed stroller configuration, in which the stroller frame is pivoted away from the rear of the suitcase portion.

3. The convertible apparatus of claim 2, wherein the stroller frame is extendible and an upper end thereof is configured to define a handle for:

transporting the convertible apparatus when in the retracted suitcase configuration; and wheeling the stroller when the convertible apparatus is in the deployed stroller configuration.

4. The convertible apparatus of claim 3, wherein the legs of the stroller frame are pivotal about an upper end of the suitcase portion, the legs being telescopically extendible to effect height adjustment of the handle.

5. The convertible apparatus of claim 4, wherein in the retracted suitcase configuration, the backrest and seat portion are folded together so as to lie on respective planes that are generally parallel to and/or the same as that of the stroller frame, and wherein in the deployed stroller configuration, the backrest and seat portion are unfolded from one another so as to define the seat.

6. The convertible apparatus of claim 5, wherein:

in the retracted suitcase configuration, the second set of wheels assumes a stowed configuration; and in the deployed stroller configuration, the second set of wheels are deployed to engage the ground.

7. The convertible apparatus of claim 6, wherein in the retracted suitcase configuration, the second set of wheels is stowed at least partially beneath the suitcase portion.

8. The convertible apparatus of claim 7, wherein in the deployed stroller configuration:

the suitcase portion is disposed toward a rear of the stroller and is angled forwardly in the direction of forward travel of the stroller configuration; and the backrest of the deployed seat is angled rearwardly such that a child seated thereon leans back and in the direction of rearward travel of the stroller.

9. The convertible apparatus of claim 1, further comprising a locking mechanism for selectively locking the stroller frame adjacent to and away from the rear of the suitcase portion in the retracted and deployed configurations respectively.

10. A method of converting a convertible suitcase stroller apparatus from a suitcase configuration to a stroller configuration, comprising:

moving a frame, the frame comprising a pair of laterally opposed legs, a first end of each leg being movably associated with a suitcase portion, a second end of each leg being associated with a respective wheel of a second set of wheels, and a seat away from a rear of a suitcase portion such that the second set of wheels is spaced apart from a first set of wheels in the direction of travel of the stroller such that the frame pivots at a pivot, located at a top of the suitcase portion, and rotates relative to the suitcase portion; and wherein the suitcase is rotated to a position nonorthogonal to the ground when in a deployed stroller configuration;

deploying a seat portion and backrest from between the frame so as to define the seat of the stroller wherein the deploying includes pivoting and rotating the backrest relative to the laterally opposed legs.

11. The method of claim 10, wherein moving the frame comprises first releasing a locking mechanism to enable pivoting of the frame forward from the rear of the suitcase portion.

12. The method of claim 11, further comprising extending the frame upwardly such that an upper end of the frame defines a handle via which the stroller can be wheeled.

* * * * *